United States Patent [19]
Woodier

[11] 3,952,969
[45] Apr. 27, 1976

[54] DRIVE CONTROL MECHANISM FOR MOTION PICTURE PROJECTOR
[75] Inventor: James G. Woodier, Chicago, Ill.
[73] Assignee: Bell & Howell Company, Chicago, Ill.
[22] Filed: Mar. 13, 1975
[21] Appl. No.: 557,862

[52] U.S. Cl. ............................... 242/205; 352/124; 352/177
[51] Int. Cl.² ...................... G03B 1/04; G11B 15/32
[58] Field of Search ............ 242/205, 201; 352/166, 352/168, 173–176, 177, 178, 124

[56] References Cited
UNITED STATES PATENTS

| | | | |
|---|---|---|---|
| 3,240,550 | 3/1966 | Mitchell | 352/124 |
| 3,643,894 | 2/1972 | Kadowaki | 242/205 X |
| 3,707,326 | 12/1972 | Kadowaki | 352/124 |
| 3,857,633 | 12/1974 | Easterly et al. | 352/124 |

Primary Examiner—Leonard D. Christian
Attorney, Agent, or Firm—John E. Peele, Jr.; Roger M. Fitz-Gerald; Gerald B. Epstein

[57] ABSTRACT

For a motion picture projector, a mode controller is coupled through control members to a dual clutch assembly to selectively transmitted drive as required from a unidirectional input to supply and take-up devices. Particularly, the mode controller is a manually operable mode selector for adjusting a control rod carrying dual control cams to selectively actuate respective supply and take-up drive transmitting clutches to free, slip, and positive drive conditions, as well as to actuate other projector components. Responsive to conditioning of the clutches, and projector components such as shuttle retractor and other control mechanisms, the projector is changed from one mode of operation to another.

10 Claims, 6 Drawing Figures

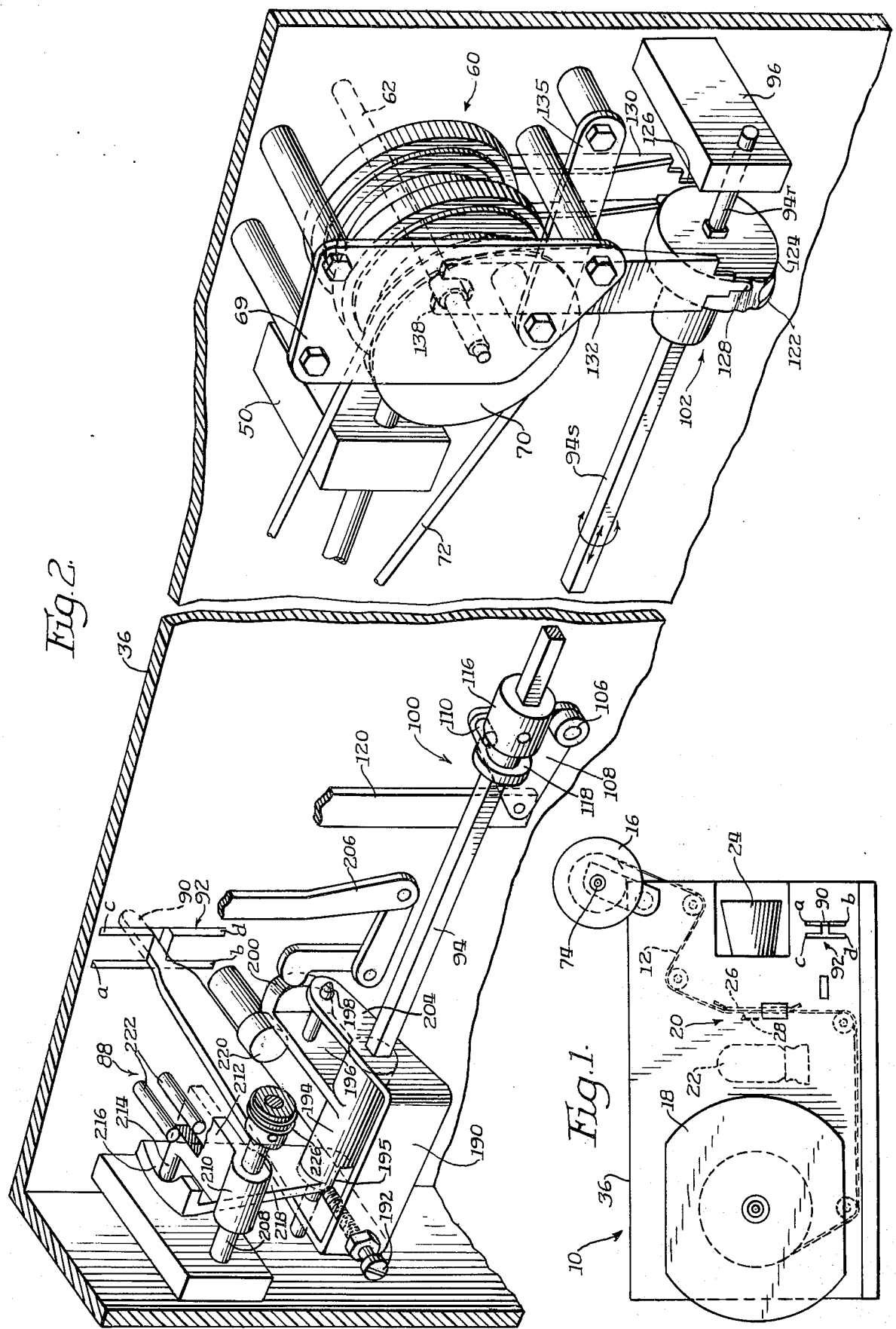

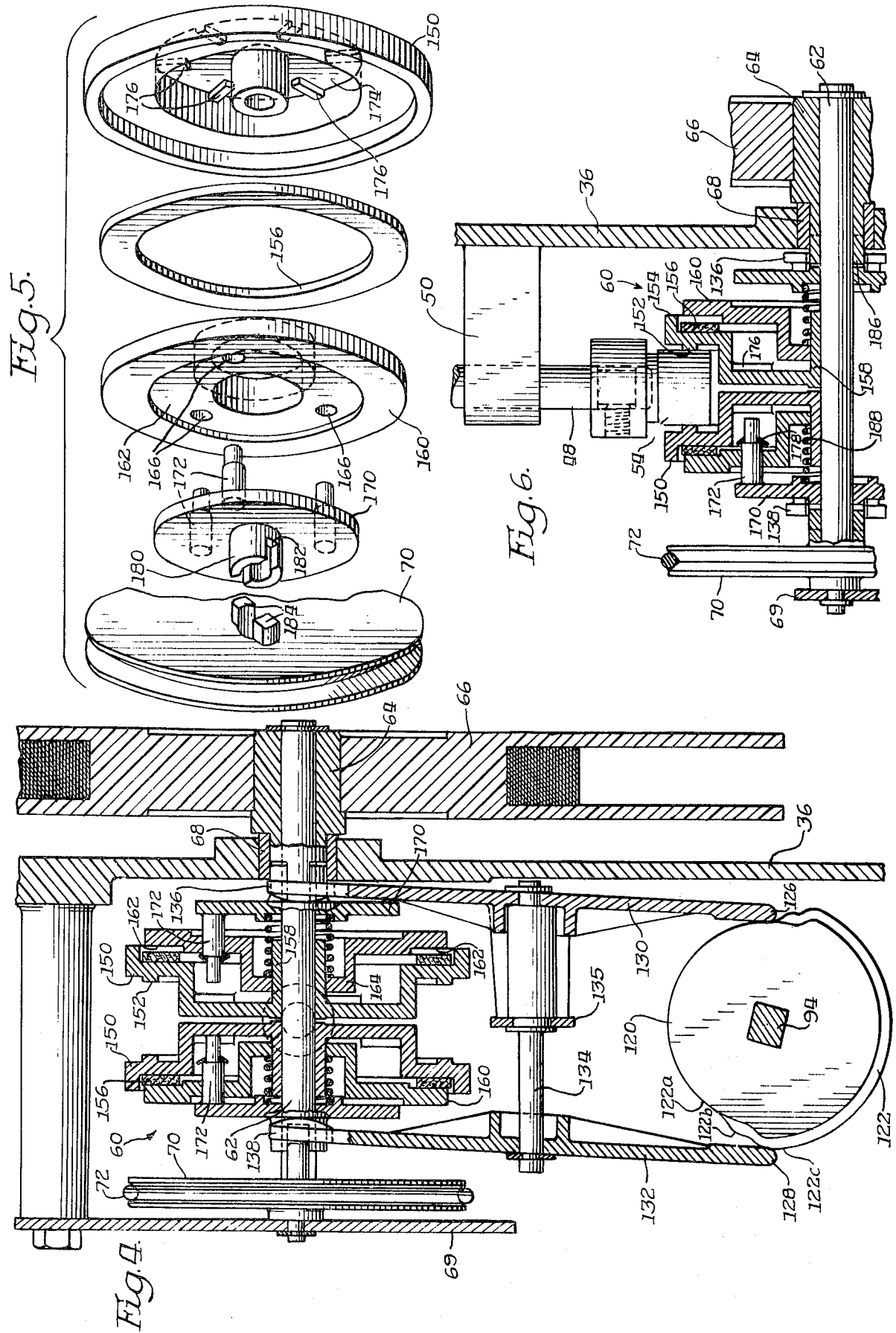

DRIVE CONTROL MECHANISM FOR MOTION PICTURE PROJECTOR

The present invention relates to improvements in a motion picture projector, and particularly to a simplified control mechanism for changing the drives for components of the projector as required for each of several projector operational modes, including: normal speed forward and reverse projection and rewind as well as high speed forward and reverse film transport or "search."

Most motion picture projectors are designed with extensive and complex multiple gear transmissions of the minimum number of operational modes, such as normal forward and reverse projection, and rewind. The complexity of the transmissions is made necessary since the supply and take-up assemblies of projectors are selectively powered and restrained as required to handle film without damage. The assemblies must be actuated to transport film in the proper direction and at the proper rate particularly when the transport rate is controlled by the shuttle. Further, the transmissions are made more complex by the need for enabling rewind of the film after projection is completed. Because of the added complexity of these transmissions, few projectors have been designed with the capability of transporting film at a high forward or reverse speed, generally identified as a "search" feature. Typical of the complex mechanisms is the transmission as described in U.S. Pat. No. 3,787,003, assigned to the same assignee. Although the desired results are obtained, the complexity and, hence the cost of the drive is greater than desired. Therefore, few projectors of this category are selected by the buying public in comparison with the more conventional, less featured projectors.

In accordance with the present invention, a simplified less costly to manufacture control mechanism including film supply and take-up drive and control is described. This mechanism provides each of the projector operational modes desired for a full-featured projector. In addition to the capability of transporting film at selected standard or normal speeds, the projector can be operated at multiple speeds and at search speeds, in addition to the normal speed. Further, the apparatus enables the projector to be operated with the supply and take-up devices either in spaced apart arrangement or in a co-axial arrangement. The principal novel mechanisms include a single lever mode controller coupled through a control member to a dual clutch assembly by which drive is selectively transmitted as required from a motor to supply and take-up devices as well as actuating shuttle control mechanisms.

In summary, the present invention includes a drive and control which are provided for components of a motion picture projector. By shifting a mode controller, a control rod carrying a dual cam and shuttle operator and direction controllers are oriented from a neutral position to one of several projector mode operating positions. In one axial orientation of the control rod, the dual cam is oriented with a first cam track aligned for actuation of a pair of clutch actuators, as the shuttle operators likewise control shuttle operation. That is, when the controller is aligned with a first slot portion the smaller diameter of the dual cam operates the clutch actuator to cause drive of an input to be transmitted to a selected output. As described, this drive output is selected for normal speed film transport. Displacing the controller upwardly from the neutral or still position causes rotation of the control rod. Responsive to this action, the active cam displaces the clutch actuators to cause the take-up output of the clutch to be in slip condition so as to be tendency driven. When a length of film is transported by the shuttle, which was made operative by the rotation of the control rod, the film is wound on the take-up reel supported on the spindle. Shifting of the controller to the other position provides for similar selective operation of components for high speed search and/or rewind.

SUMMARY OF THE INVENTION

An object of the invention is to provide for a motion picture projector or other web handling apparatus, a simple, low cost supply and take-up drive and control mechanism enabling the unit to be operated selectively in one of several operating modes.

Another object of the invention is to provide for a motion picture projector, a control mechanism for enabling the projector to be operated selectively by a positively actuated control wherein search operating modes can be obtained in addition to normal projecting modes and rewind.

Still another object of the invention is to provide for a motion picture projector, a control mechanism including a dual clutch assembly for selectively conditioning as necessary the supply and take-up devices by conditioning either of the sub-assemblies of the clutch in positive, slip or free conditins.

BRIEF DESCRIPTION OF THE DRAWINGS

The above and other objects will become more apparent from the detailed description when considered with the accompanying drawings in which like numerals refer to like parts.

IN THE DRAWINGS

Figure 3:
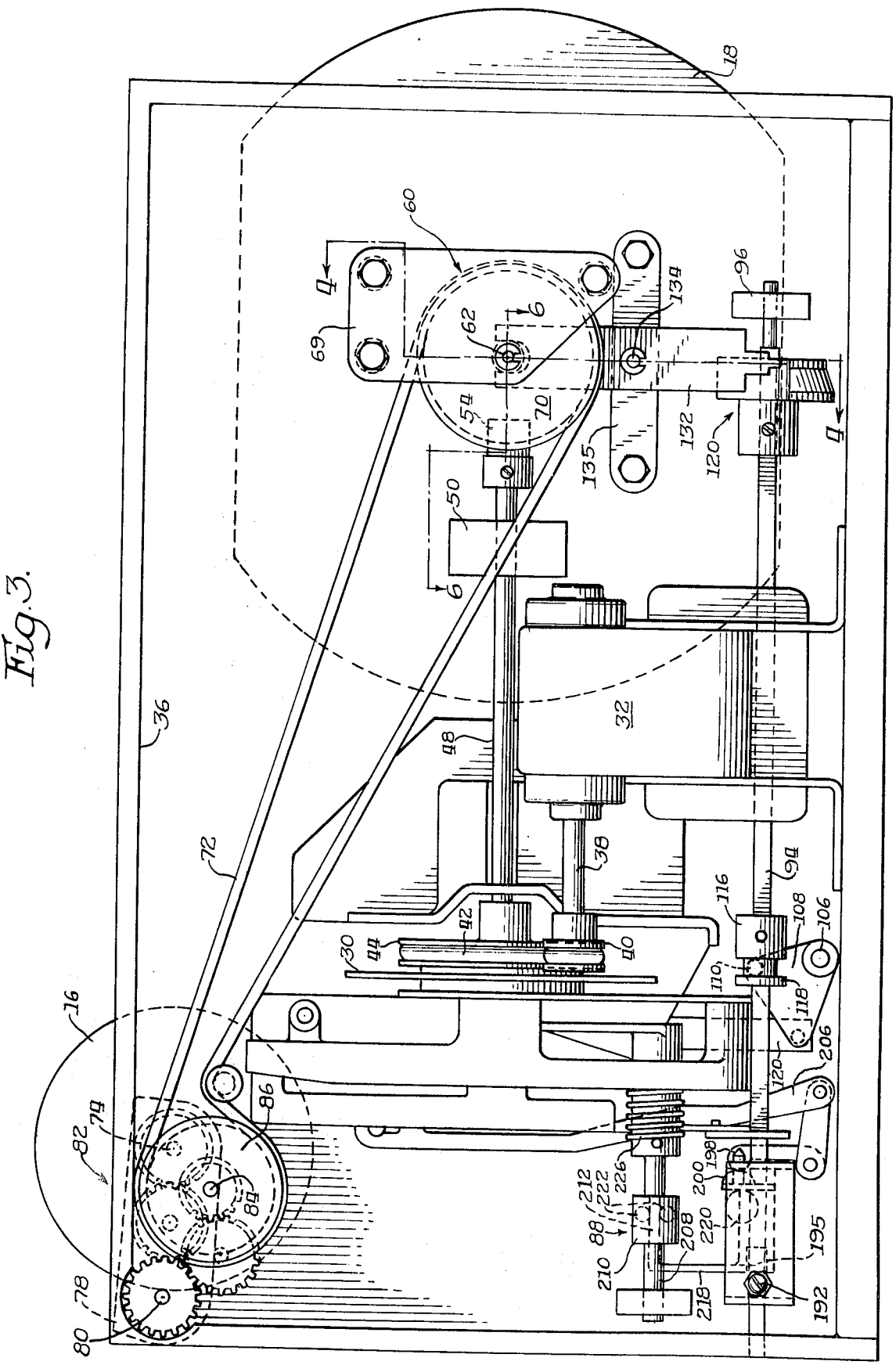

FIG. 1 is a schematic view of a motion picture projector in which subject matter according to the present invention may be incorporated;

FIG. 2 is a perspective view of the primary novel components of the present invention with parts broken away and parts omitted for clarity;

FIG. 3 is an elevational view of a projector incorporating the components as shown in FIG. 2;

FIG. 4 is a cross sectional view taken along section line 4—4 of FIG. 3, and showing the dual clutch assembly with the left sub-assembly in locked condition and the right sub-assembly in free condition;

FIG. 5 is an exploded perspective view of components of a sub-assembly of the dual clutch assembly; and FIG. 6 is a plan view of the dual clutch assembly taken along section line 6—6 in FIG. 3 with the left sub-assembly of the clutch in slip condition and the right sub-assembly in free condition.

DESCRIPTION OF A PREFERRED EMBODIMENT

Referring now to the drawings, and particularly to FIG. 1 in which a web handling apparatus, such as a motion picture projector, is shown generally at 10. The projector has a path along which an elongated web, such as a film 12, is transported between a supply device 16 such as a cartridge (not shown) or a supply reel and a take-up device 18 such as a take-up reel. The web movement path passes through a transducing station such as a projection station 20. In this embodiment of a motion picture projector, the station includes a projection lamp 22, a projection lens 24, and a gate 26 at which an intermittent film transporting mechanism or shuttle 28 is arranged. As better seen in FIG. 3, a shutter 30 is arranged to be rotated in synchronism with movement of the shuttle when powered by the prime mover of the projector.

The prime mover for driven components of the projector is an electrically energized motor 32, fixedly supported in the housing 36 of the projector. To an end of the drive shaft 38 of the motor is fixed a pulley 40 about which a belt 42 is arranged to drive a cooperating pulley 44 fixed to a driven shaft 48. To the driven shaft, which is supported in bearings 50 extending from a mechanism support plate or the housing 36, is fixed the shutter 30 and a shuttle control device (not shown) for actuating the shuttle 28. The elongated driven shaft 48 extends from the vicinity of the shuttle and the shutter toward the vicinity of the take-up assembly 18. About the driven shaft proximate the take-up assembly is fixedly attached a friction driver 54 as seen in FIG. 3 and 6. In this embodiment, the motor 32 is unidirectionally driven causing the driver 54, to be unidirectionally rotated as well.

Internally of the projector housing and associated with the assembly of the take-up device 18 is a dual clutch mechanism assembly 60. The components of the clutch mechanism are arranged axially on a shaft 62 for rotation relative thereto. A take-up spindle 64 is supported on the outer end of the shaft for releasably receiving a reel 66. As seen in FIG. 4 and 6, the spindle 64 is carried on the shaft 62 and in a bearing 68 mounted in the housing 36, and a mechanism support plate 69, spaced from the housing 36, supports the inner end of the shaft 62. One sub-assembly of the dual clutch assembly 60 is coupleable selectively to the spindle such that the take-up device may be in one of three operational states, i.e., free, frictionally restrained or slip, and positively driven. Internally of the projector housing, the shaft 62 of the clutch assembly 60 supports a pulley 70 capable of actuation in the same three conditions. The operational state selected for operation of both the pulley and the spindle depends on the mode of operation of the projector. A drive belt 72 connects the pulley 70 to the assembly of the supply device 16 to cause a reel supporting spindle 74 to be in either a driven, a restrained, or a free condition.

The supply asembly 16 of this preferred embodiment includes the externally arranged reel supporting spindle 74 mounted on an arm 78 pivoted about a shaft 80. Gears or other mechanical transmission components 82, couple the supply spindle 74 to a shfat 84 supporting a pulley 86 about which the drive belt 72 is entrained. The transmission means enable the spindle to be driven responsive either to rotation of the driving pulley 70 or withdrawal of film from the supply reel 66. For example, for film transport during normal forward projection, the pulley 70 of the dual clutch mechanism 60 is not powered. Hence, the drive belt 72 and the supply spindle are free to be rotated as required for withdrawal of film from the supply. The take-up spindle is conditioned to wind up film to the extent permitted by the film being fed from the supply to the shuttle 28. The transmission means 82 through which the supply spindle is driven provides a speed reduction and slight drag wherein the supply does not free wheeel to the extent of spilling film. Likewise, in the reverse projection mode, the pulley 70 of the dual clutch assembly is frictionally driven with the pulley clutch assembly in the slip state to cause the supply spindle to be operated in a tendency drive condition. The supply pulley 86 and the spindle 74 thereby rotate to wind up film as the shuttle pulls film from the take-up reel on which the film supply is wound.

Conditioning of the projector to the several operational modes is obtained through a mode controller assembly 86 including a control lever or selector 90, which extends through the projector housing 36 for manual actuation. In this preferred embodiment, the end of the controller lever passes through an H shaped slot 92, which permits the lever to be shifted from a neutral or still projection mode at the cross bar of the H to the ends of the legs of the slot. As the lever is shifted in the slot to the ends of different legs thereof, the projector is caused to operate in selected operational modes. As typically shown in FIG. 1 and FIG. 2 (viewed from the back), positions $a$ and $b$ provide respectively for normal forward and reverse projection modes. Similar positions $c$ and $b$ provide respectively for forward and reverse search modes when film is threaded through the projector, and high speed rewind or forward wind modes when film is connected directly between the supply assembly 16 and the take-up assembly 18 but not threaded through the film path of the projector.

As seen in FIG. 2, the control lever 90 is positionable relative to an axis defined by a control rod 94 by a combination of arcuate pivoting and lateral shifting movements. The position of the control lever is transmitted to the operated components of the projector by the control rod 94. The control lever is connected to the control rod in a manner to prevent relative rotation and longitudinal shifting along the rod. In this embodiment, the control rod is square in cross section ($94s$) except for the portions $94r$ in which the rod is supported slidably in bearing members 96 fixed to the housing 36 of the projector.

Axially spaced along the control rod and fixed thereto against relative movement are motion translating components including a gate and side tension control 100 and a clutch control 102. By an offset axis 106 supporting pivotably a plate 108 of the gate control assembly, a stud 110 extends from the plate into a control sleeve 116 fixed to the rod. As the rod is shifted, the sleeve is caused to move axially therewith. However, since the stud 110 fits in a slot 118 of the sleeve, the limited angular movement of the rod does not affect the relationship between the rod and the sleeve. As the sleeve shifts, due to axial movement of the control rod, the plate 108 is pivoted causing the connecting link 112 of the gate and side tension control 100 to be displaced from a first position to a second position. One position is a gate closed and side tension applied condition, while the other position is a gate open, side tension removed condition as is desirable for the high speed or search modes.

As the control rod 94 shifts longitudinally, the unitary, double track cam 120 fixed to the rod is shifted selectively to align one of its tracks 122, 124 with a cam follower portion 126, 128 formed respectively on both a spindle clutch actuator 130 and a pulley clutch actuator 132 by which the clutch assembly 60 is conditioned. In this embodiment, the unitary cam 120 is fitted over the control rod 94 and retained thereon so that when the rod is in one position, e.g., to the left in FIG. 2, cam track 124 is the operating cam, while when the rod is to the right, cam track 122 is the operating cam. As best seen in FIG. 4, both actuators 130, 132 are mounted for pivotable movement about an axis through a stub shaft 134 fixed on the housing 36 by a support plate 135. As each actuator is displaced pivotably responsive to rotation of the dual cam 120, the sub-assemblies of the dual clutch assembly 60 are shifted from a first operational state to another operational state to selectively transmit power from the friction driver input 54 as required. A fork end 136, 138 of the respective actuators 130, 132 causes displacement of portions of the clutch assembly as the end is caused to engage a clutch member responsive to the orientation of the dual tracked cam 120.

In each of the substantially duplicate sub-assemblies of the dual clutch assembly 60, a drive disc 150 is supported on the spindle shaft 62 for relatively free relative rotation. Near the periphery on one surface of the drive disc 150 is formed a slightly raised rim 152 for engaging the friction cover on the friction driver 54 on the driven shaft 48. Extending axially from the opposite surface of the drive disc 150 is formed a rim 154 relative to which a ring of friction material 156 is arranged. About the shaft 62, the disc has an extended hub portion 158 for maintaining alignment of the disc for axial sliding movement along the shaft.

Cooperating with the drive disc 150 and particularly with the friction ring 156 is a clutch plate 160. The clutch plate is provided with a recess 162 proximate the perimeter on one surface for engaging the drive disc opposite surface of the friction ring. Internally of the periphery, the clutch plate has an offset portion 164 which rides on the extended hub 158 of the drive disc 150 and can be rotated therewith or relative thereto. Approximately midway the radial extent of the surface of the clutch plate 160, a series of holes 166 formed for coupling of a driven disc 170.

The driven disc 170 is formed with a number of legs 172 extending perpendicularly from one surface thereof. The number of legs and the arrangement thereof is selected to cooperate with the holes 166 of the clutch plate 160. Along most of their length, the legs are dimensioned to fit snuggly but slidably in the holes. For a short length from the remote end of the legs, the legs are reduced slightly in diameter to fit into one of several receiver slots 174 formed in the adjacent surface of the drive disc 150. In this preferred embodiment, the slots 174 are formed by the space between a plurality of ribs 176 arranged on the surface of the drive disc 150 to be engaged by the legs 172. Following assembly, a washer 178, is frictionally fitted on each leg 172 to preclude inadvertent disassembly of the legs from the clutch plate, and to limit relative axial movement between driven disc 170 and the clutch plate 160.

Further, the driven disc 170 is provided with a hub 180 for sliding engagement on the spindle shaft 62. In the end of the hub, a slot 182 is provided for cooperating with a mating key member 184 defining either a hub portion of the pulley or a similar mating key number 186 on the spindle at the other end of the shaft. Thus, the driven disc 170 is positively and continuously coupled to the pulley and the spindle whether or not the disc is driven. However, the driven disc 170 is driven positively only when the legs 172 engage in the slots 174 in the drive disc 150. By a coiled spring 188 arranged about the hub of the drive disc 150 for separating the driven disc 170, and the clutch plate 160, the driven disc legs are normally urged away from the drive disc 150. However, when one of the clutch actuators 130, 132 is caused to be displaced from one condition to another the clutch plate 160 is shifted axially against the resistance of the spring 188 to cause the legs 172 to approach the drive disc 150. In a partial displacement of the driven disc 170 toward the drive disc 150, as in FIG. 6, the clutch plate is urged with a slight pressure toward the drive disc. However, the legs are not moved into engagement in the slots 174 of the drive disc 150 although the spring causes drive transmission through the friction disc 156. In this condition, the drive from the driven shaft 48 causes the clutch plate to be tendency driven but permits slippage to occur if the spindle is slightly restrained. This condition is used when the projector is in the normal reverse proejction mode with the spindle actuator tilted slightly by the cam surface with which it is engaged. As seen in FIG. 4, the cams 122, 124 have three levels 122a, 122b, 122c, which are engaged by the cam followers depending on the orientation of the cam. Level 122c is the high level causing positive drive of the clutch sub-assembly as to the left in FIG. 4. Level 122a is the low level condition in which the clutch is not actuated but remains free.

The second alternative condition of the clutch established by the high surface, causes displacement of the driven disc 170 sufficient to cause the legs to engage in the slots 174 of the drive disc 150. In this condition, the driver roller 54 of the driven shaft 48 engages strongly the drive disc 150. The driven disc 170 is displaced a maximum so that the legs thereof enter the slots of the drive disc for positive driving rotation of the driven disc 170. Through the keying of the driven disc with the spindle or the pulley, drive is transmitted directly to the spindle to cause positive high speed rotation of the spindle.

As previously described, the control lever 90 is actuatable for forward and reverse operation of the projector. The laterally engageable double cams 124, 122 provide different displacements to the spindle and pulley actuating cam followers 126, 128 of the dual clutch actuators. For forward projection, the spindle cam displaces the cam follower to cause the take-up to be tendency driven, while the pulley cam permits free rotation of the pulley. Conditioning of the projector for reverse projection mode of operation, the spindle and pulley cams are respectively positioned so that the spindle is free and the pulley is tendency driven. For the forward search mode, the spindle is positively coupled and the pulley is free, while for the reverse search mode, the pulley is positively coupled and the spindle is free. Since the control lever must pass through a neutral condition to shift from one condition to another, adequate slow down of the reels occurs to preclude film spillage. Further, the cams cause the clutch to pass through the tendency drive which functions as a low efficiency brake means for both the supply and take-up assemblies.

The mode controller assembly 88 is arranged to translate the position of the controller handle or selector 92 to components of the projector. Responsive to the position of the handle in the H-slot, the controller is pivotably and axially movable about the axis through control rod 94. The controller handle 88 is an extension of a U-shaped frame, 190 fixed to the controller rod 94 by a screw 192. Between the arms of the U-shaped frame and supported for axial movement on the control rod is a carrier 194 provided with a cut out 195 which clears the screw 192 for relative movement of the carrier and the control rod. Extending radially from the carrier is a bar member 196 from which extends a pin 198 and a spaced rounded foot portion 200. The arm 204 of the frame 190 opposite the handle arm is provided with a pin receiver through which the pin can be passed. When the pin is inserted into the receiver, the frame and the carrier are coupled for pivotal movement together. This simultaneous pivoting action occurs only when the mode controller is in the normal projection modes represented by positions a and b. As the carrier pivots, the foot is removed from engagement with a shuttle retractor link 206. When the controller is shifted axially from the pin engaging condition, the pin receiving arm is moved away from the pin carrier. In this condition for the neutral and search modes, the frame is pivotable independently of the carrier. That is, the shuttle retractor engaging foot is not removed from alignment with the retractor link thereby maintaining the shuttle retracted and inoperative.

Adjacent the frame and extending from the housing is a shaft 208 on which a sleeve 210 is fixed. The shaft is slidably supported in a housing bearing portion and a mechanism support bearing. From the sleeve extends a plate 212 having thereon a cam follower 214. The cam follower engages a cam surface 216 which is formed on a wing 218 extending from the carrier. Since the carrier 194 is fixed against axial movement on the control rod 94 by engagement of the rear of the foot 200 against a fixed rod 220, the wing 218, and the cam surface 216 are likewise restrained against comparable movement. However, as the U-frame 190 is pivoted, the cam section is pivoted similarly causing the sleeve and the rod to be displaced axially. The plate is precluded from the pivotal movement by being sandwiched between a pair of fixed guide posts 222. Thus, when the high portion of the cam section is aligned with the cam follower, the sleeve is caused to move axially thereby displacing an associated shuttle reversal control from a first condition to a second condition. Upon return of the low cam section to a position of cam follower engagement, a spring 226 coiled about the reversal control urges the plate and sleeve toward the position as shown in FIG. 2.

In an alternative embodiment, the supply and take-up devices may be co-axially mounted with the shaft aforedescribed as the take-up shaft. A second spindle would be positioned outside of the spindle 64 supported on a shaft passing through the existing shaft 62. The additional shaft would be keyed to the driver disc 170 through the pulley hub 184 to be driven by that clutch mechanism sub-assembly.

In summary, the projector is provided with a mode controller and a selectively actuatable dual clutch transmission control. Positioning of the mode controller transmits to the drive and driven components of the projector each of several orientations required for actuation of the projector in the selected mode. That is, the lever of the mode controller assembly by the control rod causes all mechanisms and assemblies to be shifted as required. By the dual clutch, the supply and take-up assemblies are selectively powered as needed. Hence, as easy to manufacture, relatively simple projector drive and control mechanism is described wherein the projector is capable of operation in the normal forward and reverse projection modes, the rewind mode, and forward and reverse fast drive or search modes.

What is claimed is:
1. In a motion picture projector having means to project a motion picture film at a projection station and means to transport film from a supply means through the projection station to a take-up means, the projector including a control means adjustable to a plurality of positions for conditioning the operation of the projector to a plurality of operational modes, the improvement in the control means comprising:
   a shiftable member manually actuatable between a plurality of positions;
   a control shaft coupled with said shiftable member and being movable axially and rotationally responsive to positioning of said shiftable member;
   a shuttle retractor and reverse control member operable by said control shaft;
   a dual cam fixed on said control shaft for axial and rotational positioning responsive to adjustment of said shaft;
   a plural clutch device actuated by said dual cam for controlling respectively a first output means and a second output means;
   cam follower means coupling said cams to said clutch devices for actuating a respective one of said clutch devices to free condition, slip condition, and positive drive condition;
   a shaft supporting said output means for rotation thereon;
   keying portions provided on said output means;
   keying members on said first and second clutch devices being in engagement with said keying portions for driving of said output means;
   said clutch devices including driven means and driver means arranged for relative displacement from a non-coupled condition to a semi-coupled condition and to a positive coupled condition, said driven means being non-responsive to said driver means when in said non-coupled condition, being partially responsive to said driver means in said slip coupled condition, and being positively responsive to said driver means in said positive coupled condition; and
   said output means driving said supply means and said take-up means and being drivable respectively by said driven portions of said clutch means.

2. The control means as in claim 1 wherein said projector is provided with a unidirectional input device and said plural clutch device includes sub-assemblies having a drive disc arranged for continuous engagement with said input device, a clutch disc displaceable relative to said drive disc, and an input driver disc selectively displaceable into engagement with said drive disc.

3. The control means as in claim 2 wherein said driver disc is provided with leg members cooperating with said clutch disc and being displaceable into engagement with said drive disc for positive drive transmission to said output means when in engagement.

4. An improvement as in claim 1 wherein said cam means is a dual cam assembly with the cam surfaces arranged axially with diametrically opposed active surfaces; and
   wherein each said cam follower means is arranged to engage one of said cam surfaces for cooperating with respective of said clutch assemblies for controlling actuation thereof.

5. A drive mechanism for selectively actuating a motion picture projector to several operational modes to transport film between supply means and take-up means, the drive mechanism comprising:
- manual control means shiftable between plural positions corresponding to projector operating conditions;
- a control rod mounted for rotation and axial displacement and actuatable by said control means;
- coupling means carried on said control rod for controlling actuation of driven assemblies responsive to orientation of said control rod;
- cam means fixed to said control rod for movement therewith;
- drive means providing unidirectional input means;
- at least two clutch assemblies arranged for continuous engagement with said input means;
- cam followers cooperating with respective of said clutch assemblies for controlling actuation thereof responsive to orientation of said cam means;
- shaft means supporting each of said clutch assemblies including driver means and driven means;
- output means carried on said shaft means coupled to one of said driven means, and supporting said take-up means;
- another output means carried on said shaft means coupled to another of said driven means and supporting a supply means drive; and
- said driver means and said driven means being relatively displaceable from a non-coupled condition to a semi-coupled condition and to a positively coupled condition, said driven means not being rotated by said driver means when in said non-coupled condition, said driven means being slip driven in said semi-coupled condition and being positively driven in said positive coupled condition.

6. An improvement as in claim 5 wherein said cam means is a dual cam assembly with the cam surfaces arranged axially with diametrically opposed active surfaces; and
- wherein each said cam follower means is arranged to engage one of said cam surfaces for cooperating with respective of said clutch assemblies for controlling actuation thereof.

7. An improvement as in claim 5 wherein said driven means and said driver means of said clutch assembly have positive engaging means for coupling said driven means and said driver means in non-slip relationship when in one relative position.

8. An improvement as in claim 5 wherein friction means are arranged between surfaces of said driven means and said driver means for slippably coupling said driven means and said driver means when in one relative position.

9. A drive control mechanism for selectively actuating a motion picture projector to several operational modes to transport film between supply means and take-up means, the drive control mechanism comprising:
- manual control means shiftable between plural positions corresponding to different projector operating modes;
- a control rod mounted for rotation and axial displacement and actuatable by said control means;
- means positioned by said control rod for causing axial displacement upon rotational movement of said control rod;
- coupling means carried on said control rod for controlling actuation of driven assemblies responsive to axial orientation of said control rod;
- dual cam means having axially spaced and diametrically opposed cam surfaces fixed to said control rod for movement therewith;
- drive means providing unidirectional input means;
- a dual clutch assembly arranged for continuous engagement with said driver means;
- cam followers cooperating with respective of said cam means and of said clutch assemblies for controlling actuation thereof responsive to rotational and axial orientation of said cam means;
- shaft means supporting each clutch assembly including driver means and driven means;
- friction means arranged between said driver and said driver means for slippably coupling said driver means and said driven means when displaced from a non-coupled condition;
- first output means supported on said shaft means coupled to one of said driven means, and supporting said take-up means;
- second output means supported on said shaft means coupled to another of said driven means and supporting a supply means drive; and
- said driver means and said driven means being relatively displaceable between a non-coupled condition, a semi-coupled condition, and a positively coupled condition, said driven means being in a free mode when in said non-coupled condition, being slip driven when in said semi-coupled condition and being positively driven when in said positive coupled condition.

10. The control means as in claim 9 wherein said driver disc is provided with leg members cooperating with said clutch disc and being displaceable into engagement with said drive disc for positive drive transmission to said output means when in engagement.

* * * * *